United States Patent [19]

Haastert

[11] Patent Number: 4,952,925
[45] Date of Patent: Aug. 28, 1990

[54] PROJECTABLE PASSIVE LIQUID-CRYSTAL FLAT SCREEN INFORMATION CENTERS

[76] Inventor: Bernd Haastert, Weberstrasse 24, D-5300 Bonn 1, Fed. Rep. of Germany

[21] Appl. No.: 147,791

[22] Filed: Jan. 25, 1988

[51] Int. Cl.⁵ .............................................. G09G 3/36
[52] U.S. Cl. .................. 340/784; 350/331 T; 353/60
[58] Field of Search ........... 350/705, 765, 784, 331 R, 350/331 T, 334, 337, 338, 344, 351, 352; 340/705, 765, 784; 353/55, 57, 58, 60, 61, 65, 66, 67, 72, 122, 30

[56] References Cited

U.S. PATENT DOCUMENTS

| | | | |
|---|---|---|---|
| 3,844,650 | 10/1974 | Nicholson et al. | 353/122 |
| 3,895,866 | 7/1975 | de Quervain et al. | 353/30 |
| 4,563,067 | 1/1986 | Ozeki | 353/60 |
| 4,652,101 | 3/1987 | Grunwald | 353/122 |
| 4,671,634 | 6/1987 | Kizaki et al. | 353/122 |
| 4,763,993 | 8/1988 | Vogeley et al. | 350/331 T |
| 4,772,098 | 9/1988 | Ogawa | 353/60 |

Primary Examiner—Alvin Oberley
Assistant Examiner—Richard Hjerpe
Attorney, Agent, or Firm—K. S. Cornaby

[57] ABSTRACT

The passive liquid-crystal flat screen which can be projected onto a screen has a flat screen (50) to which an electronic control unit (52) is attached and two polarization filters (36, 38) both of which are located in the light path (arrow 54), the one in front of, and the other behind, the flat screen (50). Both the polarization filters (36, 38) are positioned at such a distance from the flat screen (50) that between the flat screen (50) and each of the polarization filters (36, 38) there is formed an air tunnel or canal in which a current of air flows which impinges on the inner surfaces of the polarization filters (36, 38) and the flat screen (50) and cools these components.

7 Claims, 3 Drawing Sheets

PROJECTABLE PASSIVE LIQUID-CRYSTAL FLAT SCREEN INFORMATION CENTERS

BACKGROUND OF THE INVENTION

The invention relates generally to a passive, liquid-crystal flat screen information center.

More specifically, a liquid-crystal matrix flat screen information center has a flat screen to which is attached an electronic control unit. Attached to the surface of the flat screen are a number of individual protuberances, called "Pixel." These Pixel are connected by means of conductors to the control unit and are capable of being switched between a translucent and a light-absorbing state. The flat screen is also fitted with two polarisation filters, one of which is located in the light path in front of, the other in the light path behind, the flat screen. The existing flat screens of this kind can be placed on the surface of an overhead projector on which material is placed to be projected onto a screen. Thus, the information on the flat screen can be transmitted in the form of writing, formulas, drawings, or the like, onto a screen. In the existing flat screens the polarisation filters are firmly attached to the actual flat screen. This has several disadvantages:

1. Present flat screens with a relatively large surface area require relatively large polarisation filters. The polarisation filters made of plastic sheeting which are usually employed have a limited life span, typically 600 hours, as the polarisation sheets are broken down by heat and emissions from the light source, especially by the ultra-violet component of the light source. As regards the existing flat screens, when the polarisation filters are no longer usable, they must be replaced and the flat screens must be replaced with them.

2. The flat screen itself is affected by heat. Sufficient projection contrast can be achieved only below 50° C., and in the more modern indicators only below 40° C. By reason of the light source which is required for projection, however, the polarisation sheets and the flat screen itself are also heated, the light source especially emitting a high IR-energy component. Most of the heat is absorbed in the lower polarisation sheet, that is, the one which faces the source of light, and the heat which is thereby generated is transmitted to the flat screen to which it is attached. Although the flat screen itself absorbs only a small amount of heat, this also contributes to an increase in temperature. Finally, a further amount of the light energy is trapped in the second polarisation filter and heats it. As the second polarisation filter is also attached to the flat screen, further heat is thus conducted to the flat screen. Until now, it has proven difficult to project liquid-crystal indicators onto large surfaces. In consequence of the transference of heat from the light source various pixel of the flat screen can, depending on the quality of the technology, change color even though they are not directed by the control unit.

Liquid-crystal indicators nevertheless offer a number of advantages which recommend them over all other indicators. These advantages include: low operating voltage, absence of shimmering, low weight, flat construction, transparency and resistance to interference by rays. Thus, their application in projection devices is worth serious consideration.

Proceeding from these premises, it is the purpose of the invention to improve the liquid-crystal indicators described above, but especially the liquid-crystal matrix-indicators, in such a way that they are suitable for projection. In this way, they are especially resistant to the heat to which they are subjected when they are placed on the projection surface of an overhead projector. This objective is achieved by a liquid-crystal indicator having the following characteristics: Both the polarisation filters are positioned on such a distance from the flat screen that the flat screen and each of the polarisation filters there is formed an air tunnel or canal in which there flows a current of air which impinges on the inner surfaces of the polarisation filters and the flat screen and cools them.

By reason of the distance between both the polarisation filters and the flat screen, the polarisation filters cannot directly transfer the heat which they absorb to the flat screen. Moreover, the polarisation filter can be exchanged independently of the flat screen. But of greatest significance is the fact that a space is thereby created between the flat screen and each of the polarisation filters, and through this space a current of cooling air can be made to flow. As the heat in the conventional flat screens, which are normally operated horizontally, cannot escape by convection currents, constant cooling, generated ideally by a fan, is achieved by the air flow thus produced. This cooling is of benefit not only to the flat screen, but also lengthens the life of the polarisation sheets.

In a preferred embodiment of the invention the flat screen is housed in a flat cover. The flat screen itself has approximately the same dimensions as the projecting surface of overhead projectors, that is to say, DIN A4 or A5. The housing is just a few centimeters high, for example, 40 mm. In consequence, the distance between the flat screen and the polarisation sheets placed above and below it is just a few millimeters, for example, 15 mm to 20 mm. In order that the cooling currents flow uniformly, it is advantageous to have the pressure side of the fan, which is situated in the housing, connected directly via exhaust ports to the outside and also have a number of intake ports in the housing through which the air can be drawn. In this way, the current of air can be controlled by means of the special arrangement of the intake ports and strategically placed air-flow guides. It is therefore possible to ensure that the middle of the polarisation filters and the flat screen are exposed to greater cooling, especially since more heat is being concentrated at these points than at any others. It is also possible to direct additional fresh air to those portions of the filter and the flat screen which are at the rear of the fresh air passage. In other words, it is not necessary to attempt to cool them with air which has already been warmed through contact with other parts of the sheets.

It is proposed in further embodiments of the invention to attach at least one of the polarisation filters to a pane of glass or plastic, and attach this pane to the housing in such a way that it can quickly be detached and replaced. For this purpose, a frame would appear to be the idea solution, so that the pane attached to the polarisation sheet could be inserted into the frame. The frame can then be secured in place by locking springs, quick-release screws, removable clamps, or the like. It is important that the pane should be capable of being placed on the housing from outside, i.e., it should not be necessary to open the housing in order to remove the pane and the polarisation sheet.

It is of considerable advantage to place the polarisation filter on the housing in such a manner that it can be rotated. In this connection, it is sufficient to have a rotations angle of normal dimensions, e.g., 150°. Thus, rotation permits a variation of the color in which the material to be projected is actually displayed.

It is also advantageous to attach a UV filter to the carrying plates for the polarisation sheets and the actual flat screen, in order to protect them from ultra-violet rays. The ultra-violet rays, which release considerable energy, are prevented from promoting chemical and other damaging processes. Furthermore, it is advantageous to attach an anti-reflection coating or sheeting to the surfaces of the polarisation filters, plates and the flat screen as in this way light reflection, and therefore light loss, is decreased.

Finally, it has also proved most advantageous to utilize the flat screen in such a way that, depending on the type of presentation, as many Pixel as possible are activated. For example, if it is desired to project text, not only those Pixel which form the actual letters should be activated, but the whole of the remaining surface can also be activated in negative projection. It has been shown in tests that activated Pixel are less susceptible during projection to being affected by heat and other influences. It is therefore recommended to use the flat screen in such a way that, depending on the type of projection desired, the greatest number of Pixel are activated so as to enhance the contrast. The desired projection onto the screen (negative or positive display) is achieved by use of the control unit. For examples, if the flat screen is being employed for inverse display, then the control unit is set or controlled in such a way that it operates inversely. The invention, it should finally be noted, intends to improve the flat screen itself. In a one-level flat screen, all the Pixel are located on the one level. The individual Pixel must nevertheless be isolated electrically from one another. In consequence, there must of necessity be open spaces between the individual Pixel. Nevertheless, in one-layer flat screens, it is not possible to totally black out or totally illuminate a surface. To correct this, it is proposed to provide the flat screen with at least two layers, and to arrange the Pixel in the second layer in such a way that they occupy the spaces between the Pixel of the first layer, while the Pixel of the first layer occupy the spaces in the second layer. Thus, it is possible to achieve with a two-layered flat screen the total blacking out or, if desired, illumination of a surface. There remain very small areas which do not have the same state as the Pixel. These remaining areas can, of course, be blacked out or illuminated by assigning Pixel to them from a third layer of the flat screen. The flat screen is therefore so arranged that the flat screen surface when viewed vertically reveals that the Pixel of the various levels constitute as closely and as totally as possible a closed or dense surface, e.g., one which is free of gaps. Where two or more layers (information levels) are joined together as as to exclude spaces, those gaps are eliminated which invariably appear between the Pixel of a diagram or projection of liquid-crystal indicators. If in place of the polarisation filters or, in addition to them, colored filters are used, these two are located at a distance from the indicator unit and so are placed in the cooling air current.

THE DRAWING

A preferred embodiment of the invention is described in the following section, although it must be understood that other embodiments are possible. In this drawing.

Figure 3:
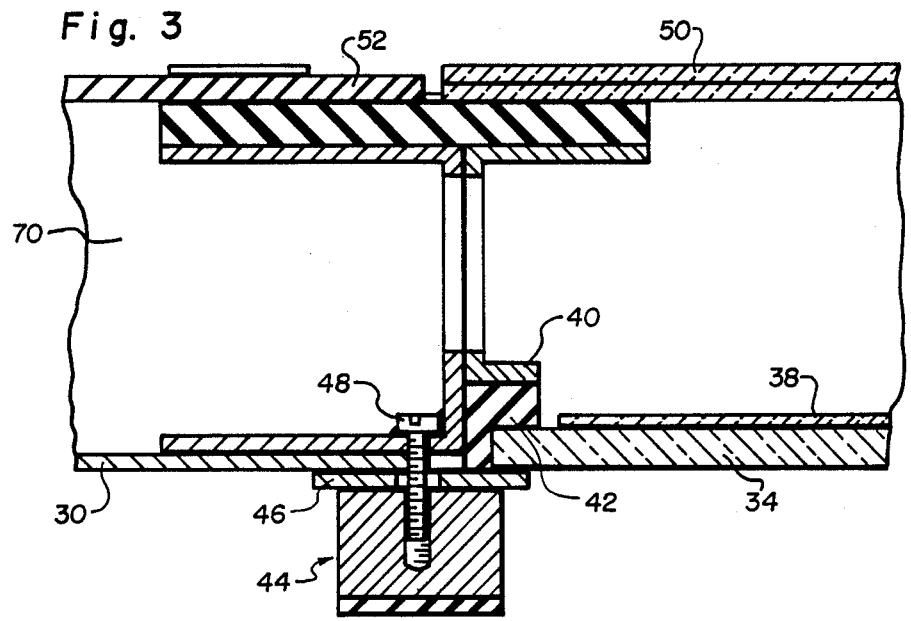
Figure 4:
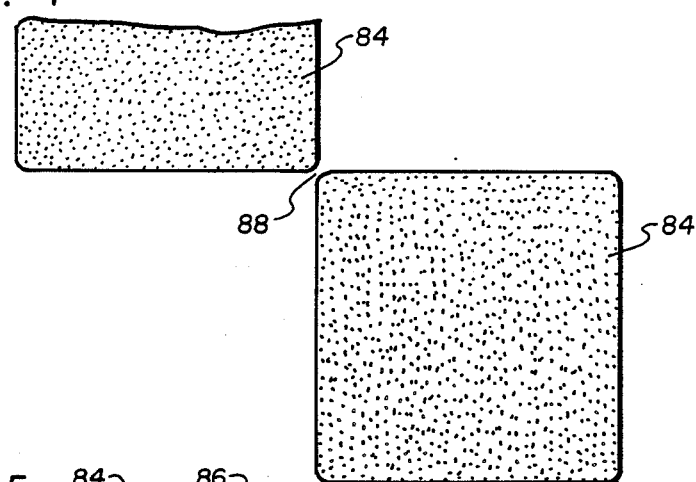
Figure 5:
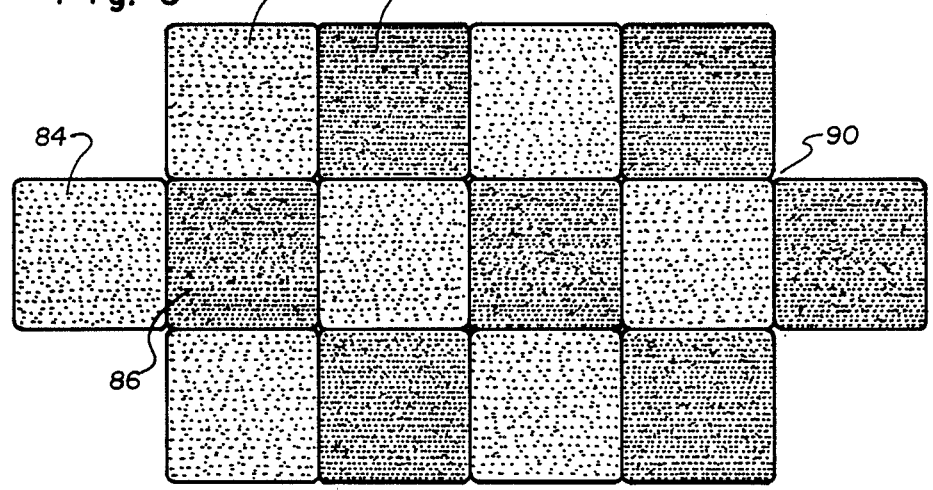
Figure 6:
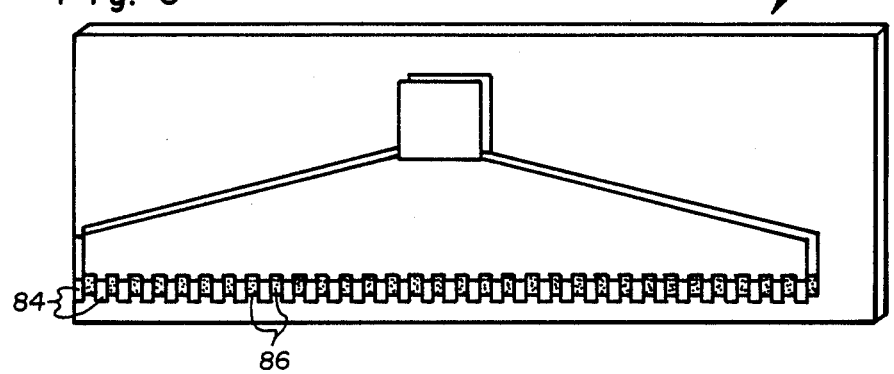

FIG. 3, a detailed sectional view through the area of a support leg;

FIG. 4, a view of two adjoining Pixel, both of which are located on the same level of the flat screen;

FIG. 5, a view of a cluster of seven Pixel which are located on two different layers of a multi-layered flat screen; and FIG. 6, a view of a linear flat screen composed of two layers.

Figure 1:
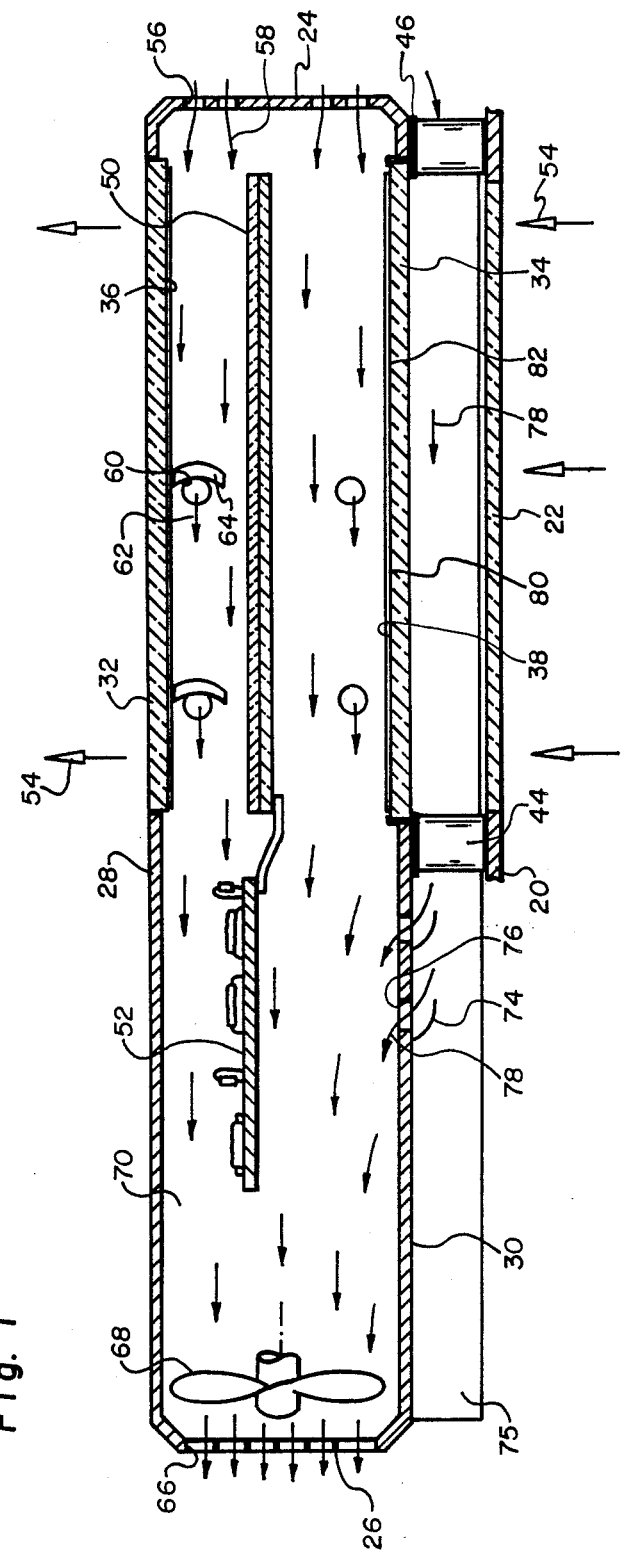
FIG. 1 is a cross-sectional side elevation through a flat screen for overhead projectors.

The flat screen as illustrated in FIG. 1 is placed on an upper, horizontal sheet (20) with a glass insert (22) of an overhead projector (which is here not shown). The flat screen has a flat, essentially cubic housing of which the right wall (24), the left wall (26), the top (28) and the base (30) are shown in the drawing. Rectangular glass panes (32, 34) are arranged o the surface of both the top (28) and the base (30). They have on their inner sides a polarisation filter (36, 38) which has approximately the same dimensions and which is glued along the surface. Both the glass panes (32, 34) including the polarisation filter attached to each (36, 38) can quickly be attached and removed from outside without the housing being opened. This is demonstrated in FIG. 1 for the lower glass panel (34); in this connection see also FIG. 3. The glass pane (34) is supported from falling into the housing by an L-shaped flange (40) which constitutes a frame. An elastic, frame-shaped component (42), also L-shaped, ensures a soft bedding. The glass pane (34) is pressed against the flange (40) by plates (46) which are linked to cylindrical supports (44). In all, four supports (44) are contemplated. Firmly attached to the housing—for example, by gluing—is a screw (48) the thread of which projects out and engages the inner thread of the pertinent support (44). If the four supports (44) are unscrewed the glass plate (34) together with the relevant polarisation filter (38) can be removed.

Between the two glass plates (32, 34) a display unit (50) of essentially the same size is located which utilizes LCD-technology. The control unit (52) is connected to it. Arrows (54) suggest the path of the light coming from the overhead projector. Because of this light, which in addition to its visible component also has both an ultra-violet and an IR component and which is partially absorbed, especially in a number of component areas (36, 38 and 50), these last-named component areas become heated. They are cooled by the cooling currents subsequently described: A large number of apertures (56) through which air streams into the housing (arrows: 58) is located in the right wall (24). This air flows through the canal-like spaces above and below the flat screen (50). This air is especially directed over the lower polarisation filter (38) in which the greatest amount of light is absorbed and consequently the most heating occurs. The apertures (56) are, in addition, arranged in such a way that the middle sections of the polarisation filters (36, 38) are especially cooled.

In addition, further air is drawn in from apertures in the side (60; arrows: 62). Air-flow controllers (64) are attached to the openings (60). The air from the side (arrows: 62) ensures that sufficient fresh air is circulated to the back areas/components (36, 38 and 50). Thus, they do not rely for cooling on the air which has already been heated (see arrows: 58). Close to the left wall (26) are located many exhaust ports (66). Directly in front of them is the fan (68) of a blower which generates the air currents described. (The blower is not represented in the drawing.) In yet another alternative embodiment (not shown) the exhaust ports can also be sited in the base (30) below the fan (68) which is shown in the drawing. In this instance the axle of the fan will be turned through 90°.

Finally, it is proposed that two fins or air-flow regulators (75) be attached parallel to the front plates (70, 72) in such a way as to approximate downward extensions of them. These fins are only just shorter than the supports (44). Intake ports (76), to which air-flow regulators are attached, are located in the base (30). These are arranged in such a way that air (arrows: 78) is directed to the underside of the lower glass plate (34) and cools it. In this way, the considerable heat generated in the lower polarisation filter (38) is conducted away. (Approximately 65% of the total amount of light absorption occurs at this point.)

Figure 2:
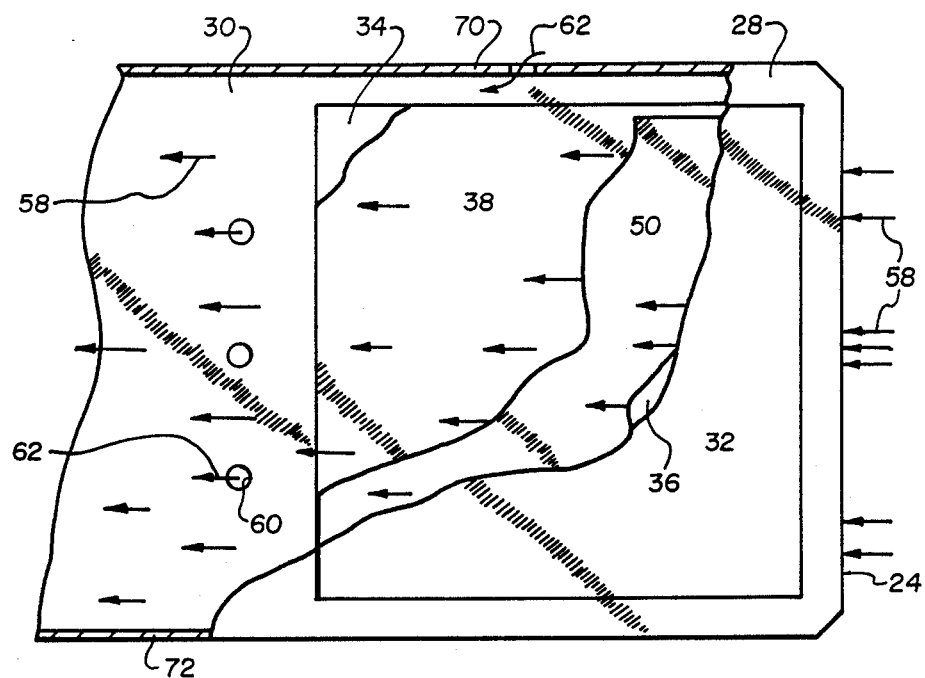
FIG. 2, is a partially sectional plan view, looking down on the display unit as shown in FIG. 1.

A plan of the individual currents of air is shown in FIG. 2. This figure illustrates that the central parts of the components/regions (36, 38 or, respectively, 50) are especially cooled. The desired cooling is achieved on the one hand by making the intake ports (56, 60 and 76) an adequate size, and, on the other hand, by incorporating fins which control the direction of the air-flow. These are indicated by the numbers 64 and 74. The apertures (56) which are located farthest away from the fan (68) have the largest diameter, that is, the closer the intake ports are sited to the fan the smaller is, in general, their diameter.

To the surfaces of components 32 to 38 and 50, which run parallel to one another, is attached an anti-reflection coating (80). In addition, it is desirable to attach in the light path (arrows: 54) in front of the display unit (50) protective filters (82) to counter the ultra-violet rays. These are indicated by the arrows (54). Although it is not shown, it is also possible to turn one of the polarisation filters, for example, the upper polarisation filter (36), on an axis running parallel to the arrows (54). For this purpose already existing mechanisms may be employed.

FIGS. 4 and 5 show Pixel (84, 86) of the display unit (50). As is well known, LCD-displays are fitted with surface areas which can be controlled electrically. They can be switched as required between the positions permeable and not-permeable. These are referred to as Pixel. FIG. 4 shows two adjacent Pixel (84) on one and the same level of the display unit (50). There must of necessity be a clear space (88) between the Pixel so that they are isolated electrically from one another. This means that the Pixel on any one single surface cannot totally fill that surface area. For this reason it is recommended in this invention that at least a two-layered flat screen (50) be employed in which the Pixel (84) of the one level are so arranged that they constitute with the Pixel (86) of the other level as far as possible one single unbroken surface. This is desirable quite independently of reasons pertaining to the necessity of cooling the unit. The arrangement is demonstrated in FIG. 5. The square Pixel (84) of the first level are therefore arranged like the black squares on a chessboard; they form together with the Pixel of the second level, which may be compared to the white squares on the chessboard, a surface which as far as possible is unbroken. Only very small gaps or holes remain (90). These gaps may, of course, be filled with the Pixel of a third level arranged so as to fill them. Both layers of the flat screen are in close proximity to one another being separated by, for example, a thin layer of glass or plastic.

FIG. 6 shows one instance of a two-layered, linear flat screen (50). It shows merely the one row of Pixel (84) in the upper layer and, directly below it, a row of Pixel (86) in the lower layer which totally fills the spaces of the top layer. It will be remembered, of course, that each Pixel can be activated separately. If all the Pixel (84, 86) of both rows are activated then the line is either transparent or non-permeable. The flat screen (50) as illustrated in FIG. 6 recommends itself for linear recording of information. The row arrangement of the flat screen (50) is read by a line light source—for example, a fluorescent tube—the light of which is focused on the row arrangement of the Pixel. All Pixel of both layers (84, 86) can be activated at the same time.

The multi-layered arrangement here described may also be employed to provide flat screens with relatively large surface areas. In such an arrangement a part of the total display is provided by one of the layers, the rest of the display being provided by the other layer or layers. Each layer has its own control unit, which, by reason of the apportioning of the total surface area to a number of layers, is downloaded relative to the electronic control for the whole surface. This results in quicker picture resolution, improved contrast and a larger format.

I claim:

1. A passive, liquid-crystal flat screen apparatus for displaying information, which information can be projected onto a screen, said flat screen apparatus having a flat screen (50) to which an electronic control unit (52) is attached in a housing, and which is also fitted with two polarisation filters (36, 38), both of which are located in a light path, the one in front of and the other behind the flat screen (50), characterized thus: That both the polarisation filters (36, 38) are positioned at such a distance from the flat screen (50) that between the flat screen (50) and each of the polarisation filters (36, 38) there is formed an air tunnel or canal in which there flows a current of air (arrows 58, 62) which impinges on the inner surfaces of the polarisation filters (36, 38) and the flat screen (50) and cools them.

2. A flat screen apparatus as set forth in claim 1, characterized thus: That a fan (68) is attached to the housing, containing the apparatus, and having fins for regulating and controlling the flow of air (64, 74) and air intake-ports (60).

3. A flat screen apparatus as set forth in claim 1, characterized thus: That the polarisation filters (36, 38) are joined to translucent sheets, which are attached to the housing in such a way as to be capable of being removed and remounted from outside the housing.

4. A flat screen apparatus as set forth in claim 3, characterized thus: That a lower wall (30) of the housing is fitted out with a frame-shaped flange (40) on which the inside of a lower glass plate (34) rests, the lower glass plate (34) being on its external surface overlapped by plates (46) which are fitted with adjustable supports (44).

5. A flat screen apparatus as set forth in claim 1, characterized thus: That the apparatus has a plurality of individual flat screens arranged one on top of the other.

6. A flat screen apparatus as set forth in claim 5, characterized thus: That the Pixel (84) of one layer of the flat screen (50) occupy the spaces formed by the Pixel (86) of a second layer of the flat screen.

7. A flat screen apparatus as set forth in claim 6, characterized thus: That the Pixel (84) of the one layer of the flat screen (50) are located on a different layer from the Pixel (86) of a second layer, and that both layers adjoin each other.

* * * * *

UNITED STATES PATENT AND TRADEMARK OFFICE
CERTIFICATE OF CORRECTION

PATENT NO. : 4,952,925
DATED : August 28, 1990
INVENTOR(S) : Bernd Haastert

It is certified that error appears in the above-identified patent and that said Letters Patent is hereby corrected as shown below:

In Col. 2, line 7, delete "on" and substitute therefor -- in--.

Line 8, following "that" insert -- between --.

Signed and Sealed this

Eleventh Day of February, 1992

Attest:

HARRY F. MANBECK, JR.

*Attesting Officer*  *Commissioner of Patents and Trademarks*